Figure 1:
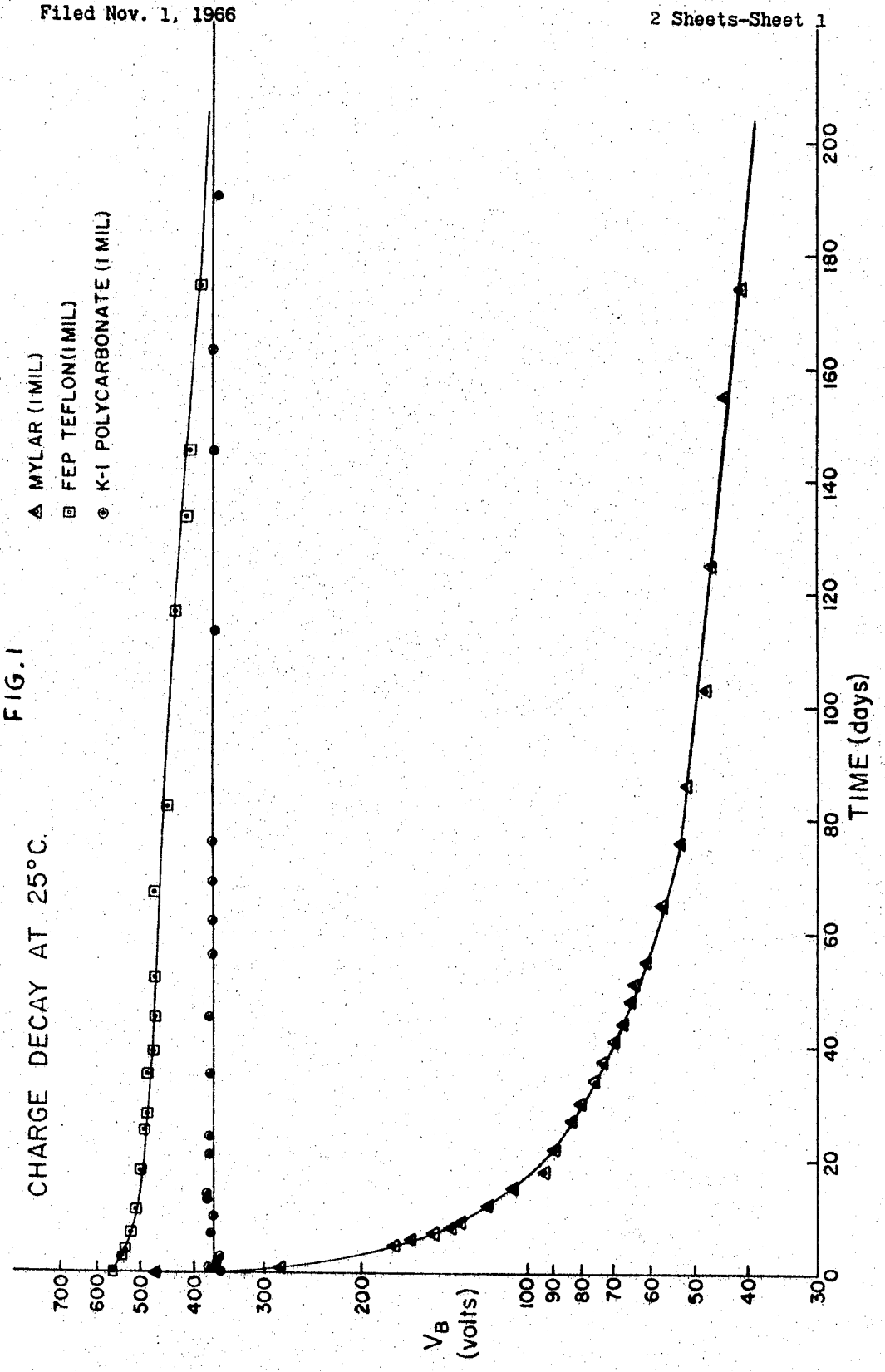

United States Patent Office 3,458,713
Patented July 29, 1969

3,458,713
POLYCARBONATE ELECTRETS
Martin Melvin Perlman, Montreal, Quebec, and Cornelis Wilfred Reedyk, Ottawa, Ontario, Canada, assignors to Northern Electric Company Limited, Montreal, Quebec, Canada
Filed Nov. 1, 1966, Ser. No. 591,321
Int. Cl. H01f 1/12
U.S. Cl. 307—88
9 Claims This invention relates to electrets and particularly to electrets made from high-molecular weight polycyclic bisphenol polycarbonates.

It has been known for many years that certain dielectric materials, such as carnauba wax, may be permanently electrostatically polarized and so form electrets. Only in recent years has it been possible to form commercially usable electrets. For instance, an electret in sheet or film form may be used as the diaphragm in a condenser microphone; the polarization of the electret obviating any requirement for an external biasing source for the condenser element. The creation of thin sheets depended upon the discovery in the art that certain stable synthetic easily worked materials, for instance polyethylene terephthalate, polyethylene or cellulose nitrate, cellulose acetate, cellulose acetobutyrate, dichloroethylene polysulphide, benzylcellulose and polymers of vinyl acetate, possess the capability of forming electrets.

It is well known that in order to polarize these polarizable dielectric materials, herein referred to as electret material, it is necsesary to (a) excite the material, for instance by heating to a forming temperature, (b) apply an electric field, and (c) allow the dielectric material to cool under the influence of the electric field. At this point, the electric field may be removed, and the electret material will have been formed into the electric analog of a permanent magnet: an electret.

An electret can be used wherever a high electric field or a charged dielectric of sensibly permanent duration is used, such as in condenser microphones and speakers, high voltage electrostatic generators, electrostatic recorders, computer memories, A.C. generators, D.C. and A.C. electrometers, phonograph cartridges, electrostatic voltmeters and relays, electrostatic precipitators, radiation dosimeters, explosion initiators, air filters, cigarette filters, a sparking device for the ignition of gas, the deflection or acceleration of charged particles, the coagulation of blood, etc. The literature shows many attempts to employ electrets for various of the above uses but they have always been found to be deficient, particularly in that they lost their charge in a relatively short time in the nonshort-circuited state.

Among the literature references relating to electrets there can be mentioned British Patents 438,672 and 610,297 and Parker United States Patent 1,804,364 as well as B. Gross, "Experiments on Electrets," Physical Review, vol. 66, pages 26 to 28, July 1, to 15, 1944; W. F. G. Swann, "Certain Matters Pertaining to Electrets," Journal Franklin Institute, vol. 250, pages 219 to 248, September 1950; A.N. Gubkin, "The Phenomenological Theory of Electrets," Soviet Physics—Technical Physics, vol. 2, No. 9, pages 1813 to 1824, 1957; Thiessen, Winkel and Herrmann, "Dielectric After-Effect in Solidified Dielectrics," Phgs. Zeits., vol. 37, pages 511 to 520, July 15, 1936; B. Gross, "Permanent Charges in Solid Dielectrics II—Surface Charges and Transient Currents in Carnauba Wax" Journal of Chem Phys., vol. 17, No. 10, pages 866 to 872, October 1949; and "Electrets, their Mechanism and Potentialities" by Dr. Andrew Gemant, in Direct Current, September 1953, pages 145 to 147.

Accordingly, it is an object of this invention to obtain dielectric solid material which will retain its charge for a long period of time, e.g., 10 years. It is also desirable that this material can exist in the form of a film (e.g., for use in a condenser microphone), as well as being inexpensive to make, small in volume and weight, performing its function efficiently and reliably and requiring no maintenance.

It has now been found that certain high-molecular weight polycyclic bisphenol polycarbonates, which have been polarized to form electrets, meet the above requirements. Of particular interest are a series of poly(bisphenol carbonates) containing either a single norbornane ring or a norbornane ring fused to another ring attached to the main molecular chain. An example of such a polycarbonate is that of the formula:

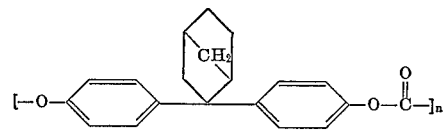

These polycarbonates are amorphous solids that are soluble in common solvents and can be cast by conventional methods to give clear, tough films with good tensile and electrical properties, and high heat-distortion temperatures. They are noncrystalline and have a molecular weight in the range of about 10,000 to in excess of 100,000.

As examples of polycyclic bisphenols from which the polycarbonates of the invention can be obtained, there can be mentioned 4,4-(2-norbornylidene)diphenols, 4,4'-(2-norbornylidene)di-o-cresol, 4,4'-(2-norbornylidene) bis (2-chlorophenol), 4,4-(2-norbornylidene) bis (2,6-dichlorophenol), 4,4'-(2 - norbornylidene) bis(2,6 - dibromophenol), 4,4'-(2-norbornylmethylene)diphenol, 4,4'-(2-norbornylmethylene) bis(2,6-dichlorophenol), 4,4'-(3-methyl-2-norbornylmethylene)diphenol, 4,4'-(3-phenyl-2-norbornylmethylene)diphenol, 4,4'-(hexahydro-4,7-methanoindan-5-ylidene)diphenol, 4,4'-(hexahydro-4,7-methanoindan-5-ylidene)di-o-cresol, 4,4'-(hexahydro-4,7-methanoindan-5-ylidene)bis(2,6 - dichlorophenol),4,4'-(decahydro - 1,4 - exo-5,8-endo-dimethanonaphth - 2 - ylidene) diphenol, 4,4'-(decahydro-1,4-exo-5,8-endo - dimethanonaphth-2-ylidene)di-o-cresol, 4,4'-(decahydro-1,4-exo-5,8-exo-dimethanonaphth-2-ylidene)diphenol and 4,4'-(decahydro-1,4:5,8-dimethanonaphth-2-yl-methylene)diphenol.

The polymer film can be polarized in the usual manner by exciting the material, e.g., by heating to a forming temperature, applying an electric field and allowing the film to cool under the influence of the electric field.

In considering the causes of charge decay in polarized material, we have shown in a qualitative manner that the self internal field of the electret is the main agent responsible for charge decay. If a pure surface charge, called homocharge $\sigma_r(t)$ is placed on an ideal (non polarizable) dielectric, charge decay will take place primarily by an Ohm's law decay through the volume of the sample under the effect of the self-internal field. A nonideal electret has in addition a time-dependent polarization $P(t)$ (a heterocharge of polarity opposite to that of the homocharge) that decays thermally. The net surface charge is $\sigma_r(t) - P(t)$ and it is this charge that is responsible for the usable external field of the electret and also for the self-internal field that causes decay. The decay of the homocharge and of the heterocharge can be represented by a number of time constants.

If $P > \sigma_r$ initially, the sample has an initial *net* heterocharge $\sigma_r - P$. Beginning in this manner, the polarization initially decays more quickly than the surface charge and the net charge "grows" and reverses in sign. In the second stage the polarization and surface charge decay at roughly the same rate and the net charge remains relatively constant. Finally, the surface charge decays more quickly than the polarization, and the net homocharge decays. In many dielectrics the reversal may take place in a very short time and with some, the surface charge decays quickly from the beginning.

If $\sigma_r > P$ initially, the sample has a net homocharge $\sigma_r - P$. If both $\sigma_r$ and $P$ were to decay at the same rate, the net charge $\sigma_r - P$ would remain constant. Here the internal field during decay is in the same direction as that during charging and, in a sense, the net homocharge holds the heterocharge.

Thus, it will be seen that according to the theory of this invention, one of the requirements for a long-lived electret is a large volume resistivity. If the resistivity is small, the surface homocharge $\sigma_r$ disappears by conduction in a short time. The internal field is then opposite to that during charging and the remaining heterocharge thus decays in a relatively short time. Since a large resistivity implies a slow rate of decay of $\sigma_r$, one must select a material with a comparable slowly varying polarization $P$ for a slow rate of decay of $\sigma_r - P$. The electrets of this invention have a volume resistivity that is immeasurably large at room temperature ($>10^{20}$ ohm cm.) as well as a heterocharge whose decay rate is comparable to that of its homocharge. Thus, an electret made from a high-molecular weight thermoplastic polymer obtained from 4,4'-(2-norbornylidene)diphenol can be expected to have a very long life.

A series of comparative tests were conducted to compare the charge decay of the electret of the invention with that of other known electrets. For these tests the materials which were used were a high-molecular-weight thermoplastic polymer made from 4,4'-(2-norbornylidene) diphenol available from Eastman Chemical Products, Inc. under the name "K-1 Polycarbonate Resin"; polyethylene terephthalate available under the trademark "Mylar" and polytetrafluoroethylene available under the trademark "FEP Teflon." The three materials were made into 1 mil films and polarized to form electrets.

The polarization was carried out in a fixture consisting of two electrodes adapted to sandwich the film between them. Two flat, essentially rigid and thin insulating plates were provided, one plate separating the film from one electrode, and the other plate separating the film from the other electrode. The complete sandwich, made up in this manner, was heated to a temperature above the forming temperature of the film, below the melting temperature of the film and below the forming temperature of the insulating plates. A potential sufficient to polarize the film was then applied across the electrodes and the entire fixture was allowed to cool to normal room temperature, still under the influence of the potential.

To form the particular electrets used in the tests, the potential was applied for one half hour at 120° C. and continued for three hours while the sample cooled to room temperature.

The invention is illustrated by the attached drawings in which:

FIGURE 1 is a plot of voltage against time for the three electrets mentioned above, and FIGURE 2 is a plot of last relaxation time against temperature for two electrets.

In the plot shown in FIGURE 1, the quantity plotted as ordinate is proportional to the net homocharge density. From this figure it will be seen that polyethylene terephthalate (Mylar) and polytetrafluoroethylene (FEP Teflon) electrets show considerable voltage decay over a period of 9 months while the polycarbonate electret of the invention showed no decay during this same period.

It will, of course, be recognized that it is not practical to try to determine the charge decay lifetime of the polycarbonate from the horizontal line of FIGURE 1. Thus, it is necessary to try to estimate this life from decay measurements at elevated temperature. For many dielectrics, the dependence of the last relaxation time $t$ in the charge decay on the absolute temperature T is given by a relation of the formula $$t = \alpha e^{\epsilon}/kT$$

where $\epsilon$ is an activation energy,
$k$ is Boltzmann's constant, and
$\alpha$ is constant.

Figure 2:
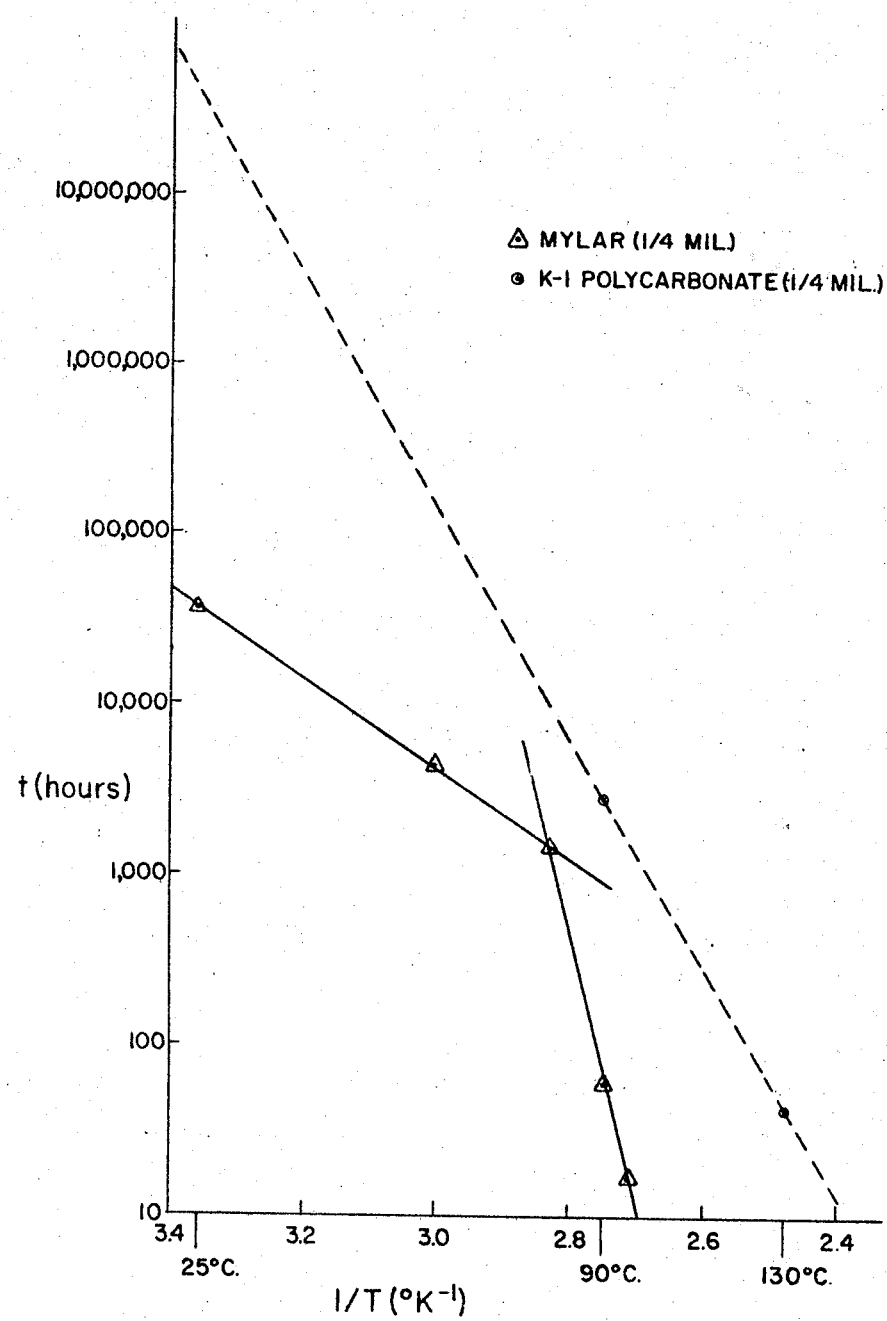

A so-called "Arrhenius" plot of $\ln t$ or $1/T$ usually yields one or more straight lines of different slope, the transition from one straight line to another being associated with a charge in the mechanical properties of the material. FIGURE 2 is an experimental Arrhenius plot for ¼ mil "Mylar" electret over a temperature range of 25–100° C. and a corresponding line for "K-1 Polycarbonate Resin" electret based on measurements at 90 and 130° C.

Polyethylene terephthalate (Mylar) has a second order transition temperature of 80° C., being amorphous below this temperature and crystalline above it. Thus, two straight lines above and below 80° C. are evident. The polycarbonate, on the other hand, is amorphous and cannot be crystallized at any temperature so that it would be expected to follow a straight line path. On this basis a polycarbonate electret of this invention can be expected to have an indeterminately long life, certainly in excess of 10 years, as would be required for use in a condenser microphone.

We claim as our invention:

1. An electret which comprises a high-molecular weight polycyclic bisphenol polycarbonate which has been permanently electrostatically polarized.

2. An electret according to claim 1 wherein the polycarbonate is a poly(bisphenol carbonate) having a norbornane ring attached to the main molecular chain.

3. An electret according to claim 1 wherein the polycarbonate is a poly(bisphenol carbonate) having attached to the main molecular chain a norbornane ring which is fused to another ring.

4. An electret according to claim 1 wherein the polycarbonate is that of the formula

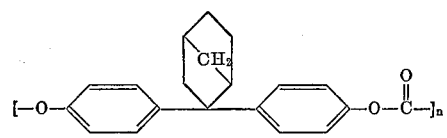

5. An electret according to claim 4 wherein the polycarbonate has a molecular weight approximately in the range of 10,000 to 100,000.

6. An electret according to claim 1 in the form of a thin film.

7. An electret according to claim 1 incorporated in a condenser microphone.

8. A method of forming an electret which comprises positioning a film of a high-molecular weight polycyclic bisphenol polycarbonate in a fixture consisting of two electrodes adapted to sandwich the film between them and two flat, essentially rigid and thin insulating plates, one plate separating the film from one electrode and the other plate separating the film from the other electrode, heating the entire sandwich including the film to a temperature above the forming temperature of the film, below the melting temperature of the film and below the forming temperature of the insulating plates, applying a potential across the electrodes sufficient to polarize the film and allowing the entire fixture to cool to room temperature while still under the influence of the potential.

9. A method according to claim 8 wherein the polycarbonate is a poly(bisphenol carbonate) having a norbornane ring attached to the main molecular chain.

References Cited

UNITED STATES PATENTS 3,274,156   9/1966   Perry et al. _____ 260—47

FOREIGN PATENTS 610,297   10/1948   Great Britain.

JAMES W. MOFFITT, Primary Examiner

U.S. Cl. X.R.

179—111; 260—47